(12) United States Patent
Youn et al.

(10) Patent No.: US 11,135,927 B2
(45) Date of Patent: Oct. 5, 2021

(54) FOUR WHEEL DRIVE VEHICLE

(71) Applicants: HYUNDAI MOTOR COMPANY, Seoul (KR); KIA MOTORS CORPORATION, Seoul (KR)

(72) Inventors: Han Shin Youn, Seoul (KR); Ho Joong Lee, Anyang-si (KR); Hye Seung Kim, Gunpo-si (KR); Joon Young Jeon, Seoul (KR); Won Yong Sung, Suwon-si (KR); Dong Jun Lee, Suwon-si (KR); Young Jin Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/693,768

(22) Filed: Nov. 25, 2019

(65) Prior Publication Data

US 2021/0001738 A1   Jan. 7, 2021

(30) Foreign Application Priority Data

Jul. 3, 2019   (KR) .......................... 10-2019-0080345

(51) Int. Cl.
*B60L 53/20* (2019.01)
*B60L 15/20* (2006.01)
(Continued)

(52) U.S. Cl.
CPC ............ *B60L 53/20* (2019.02); *B60K 17/356* (2013.01); *B60L 15/20* (2013.01); *H02J 7/0068* (2013.01);
(Continued)

(58) Field of Classification Search
CPC ...... B60L 53/20; B60L 15/20; B60L 2210/14; B60L 2210/30; B60L 2210/40;
(Continued)

(56) References Cited

U.S. PATENT DOCUMENTS

2010/0133023 A1   6/2010   Tang
2012/0153717 A1*  6/2012   Obayashi ............... B60L 50/16
                                                                  307/9.1
(Continued)

FOREIGN PATENT DOCUMENTS

JP        2017-085709 A    5/2017
KR   10-2013-0095082 A    8/2013
(Continued)

OTHER PUBLICATIONS

Zhou, Liwei et al., Bidirectional Transformerless EV Charging System via Reconfiguration of 4×4 Drivetrain,2018, IEEE, pp. 3923-3927. (Year: 2018).*

(Continued)

*Primary Examiner* — Toan T Vu

(57) ABSTRACT

A four wheel drive vehicle includes: main driving wheels and auxiliary driving wheels; a first driving motor that provides power to the main driving wheels; a second driving motor that provides power to the auxiliary driving wheels; a battery that stores electrical energy; an inverter that converts and provides the electrical energy stored in the battery to the first driving motor; and a bidirectional power converter that generates charging electric power for charging the battery by (Continued)

converting power supplied from the outside of the vehicle and converts and provides the electrical energy stored in the battery to the second driving motor.

13 Claims, 4 Drawing Sheets

(51) Int. Cl.
*B60K 17/356* (2006.01)
*H02P 5/74* (2006.01)
*H02M 7/00* (2006.01)
*H02M 1/42* (2007.01)
*H02M 3/24* (2006.01)
*H02M 3/158* (2006.01)
*H02J 7/00* (2006.01)

(52) U.S. Cl.
CPC ......... *H02M 1/4208* (2013.01); *H02M 3/158* (2013.01); *H02M 3/24* (2013.01); *H02P 5/74* (2013.01); *B60L 2210/14* (2013.01); *B60L 2210/30* (2013.01); *B60L 2210/40* (2013.01); *H02J 2207/20* (2020.01)

(58) Field of Classification Search
CPC .. B60K 17/356; H02J 7/0068; H02J 2207/20; H02M 1/4208; H02M 3/158; H02M 3/24; H02P 5/74
USPC .................................... 307/9.1, 10.1; 363/71
See application file for complete search history.

(56) References Cited

U.S. PATENT DOCUMENTS

| 2014/0368131 | A1* | 12/2014 | Katsumata | ............... B60L 53/14 318/51 |
| 2017/0117827 | A1* | 4/2017 | Ono | .......................... B60L 7/14 |
| 2017/0288593 | A1* | 10/2017 | Suzuki | .................... B60L 53/22 |
| 2018/0109193 | A1* | 4/2018 | Hirota | ..................... H02M 1/32 |
| 2018/0229618 | A1 | 8/2018 | Lee et al. | |
| 2018/0278168 | A1 | 9/2018 | Brown et al. | |
| 2019/0359074 | A1* | 11/2019 | Kume | ....................... B60L 1/00 |

FOREIGN PATENT DOCUMENTS

| KR | 10-2016-0070976 A | 6/2016 |
| KR | 10-1716238 B1 | 3/2017 |
| KR | 10-2017-0137490 A | 12/2017 |

OTHER PUBLICATIONS

Liwei Zhou et al: "Bidirectional Transformerless EV Charging System via Reconfiguration of 4×4 Drivetrain", 2018 IEEE Energy Conversion Congress and Exposition (ECCE), IEEE, Sep. 23, 2018 (Sep. 23, 2018), pp. 3923-3927, XP033464290, DOI: 10.1109/ECCE.2018.8558248, 5 pp.

European Search Report dated Jun. 4, 2020 from the corresponding European Application No. 19212319.8, 10 pp.

* cited by examiner

FOUR WHEEL DRIVE VEHICLE

CROSS-REFERENCE TO RELATED APPLICATION

This application claims priority to and the benefit of Korean Patent Application No. 10-2019-0080345, filed on Jul. 3, 2019, the entire contents of which are incorporated herein by reference.

FIELD

The present disclosure relates to a four wheel drive vehicle.

BACKGROUND

The statements in this section merely provide background information related to the present disclosure and may not constitute prior art.

In general, a four wheel drive vehicle is a vehicle that is driven by supplying power to all the front wheels and the rear wheels of the vehicle. In particular, an All Wheel Drive (AWD) vehicle always transmits power to four wheels, while appropriately distributing the power to the wheels in consideration of the grip force and the number of revolutions of the wheels, thereby improving the grip force of the wheels and enabling stable driving.

Recently, eco-friendly vehicles (particularly, electric vehicles) are equipped with driving motors so as to selectively drive either front wheels or rear wheels as main driving wheels and to drive unselected driving wheels as auxiliary driving wheels. The driving motors convert electrical energy into mechanical rotational energy, and the electrical power is respectively supplied for a driving motor for the main driving wheels and a driving motor for the auxiliary driving wheels. In particular, these driving motors are equipped with inverters that convert DC energy stored in batteries and supply it to the driving motors, respectively. Further, electric vehicles have to be equipped with an On Board Charger (OBC) for charging batteries that store electrical energy that is provided to driving motors from external charging facilities.

We have discovered that since electric vehicles including a four wheel drive system, particularly, AWD system has to be equipped with several driving motors, inverters and chargers, the system is complicated and accordingly the manufacturing costs of the vehicles are greatly increased.

The description provided above as a related art of the present disclosure is just for helping understanding the background of the present disclosure and should not be construed as being included in the related art known by those skilled in the art.

SUMMARY

Accordingly, the present disclosure provides an electric four wheel drive vehicle in which a system structure can be simplified by multiplying the functions of some of components in a four wheel drive system.

In view of an aspect, a four wheel drive vehicle according to the present disclosure may include: main driving wheels and auxiliary driving wheels; a first driving motor that provides power to the main driving wheels; a second driving motor that provides power to the auxiliary driving wheels; a battery that stores electrical energy; an inverter that converts and provides the electrical energy stored in the battery to the first driving motor; and a bidirectional power converter that generates charging electric power for charging the battery by converting power supplied from the outside of the vehicle and converts and provides the electrical energy stored in the battery to the second driving motor.

In an embodiment of the present disclosure, the second driving motor may have rated power smaller than rated power of the first driving motor.

In an embodiment of the present disclosure, the four wheel drive vehicle may further include a first switching element connected between the bidirectional power converter and a charging inlet that is supplied with external charging electric power, and a second switching element disposed between the bidirectional power converter and the second driving motor.

In an embodiment of the present disclosure, when the external charging electric power is applied through the charging inlet or the electric power of the battery is output through the charging inlet, the first switching element may be shorted and the second switching element may be opened, and when the four wheel drive vehicle is being driven, the first switching element may be opened and the second switching element may be shorted.

In an embodiment of the present disclosure, the bidirectional power converter may include a bidirectional power factor correction circuit connected to a charging inlet that is provided with the external charging power and to the second driving motor, and a bidirectional DC-DC converter connected between the bidirectional power factor correction circuit and the battery.

In an embodiment of the present disclosure, the bidirectional power factor correction circuit may include: a first input/output port selectively connected to the charging inlet or the second driving motor; a second input/output port connected to the bidirectional DC-DC converter; a boost inductor circuit including a plurality of boost inductors connected respectively to terminals of the first input/output port; and a switching circuit including a plurality of switching elements connected to the boost inductor circuit.

In an embodiment of the present disclosure, the first input/output port may have three terminals and the plurality of boost inductors may include a first boost inductor, a second boost inductor, and a third boost inductor respectively connected to the three terminals of the first input/output port; the second input/output port may have two terminals and the switching circuit may include a first switching element and a second switching element connected to each other in series between the two terminals of the second input/output port, a third switching element and a fourth switching element connected to each other in series between the two terminals of the second input/output port, and a fifth switching element and a sixth switching element connected to each other in series between the two terminals of the second input/output port; and a second end of the first boost inductor may be connected to a connection node of the first switching element and the second switching element, a second end of the second boost inductor may be connected to a connection node of the third switching element and the fourth switching element, and a second end of the third boost inductor may be connected to a connection node of the fifth switching element and the sixth switching element.

In an embodiment of the present disclosure, when 3-phase AC currents having different phases are input respectively to the terminals of the first input port from the charging inlet and the battery is charged, the first boost inductor, the first switching element, and the second switching element may form one boost circuit, the second boost inductor, the third switching element, and the fourth switching element may form another boost circuit, and the third boost inductor, the fifth switching element, and the sixth switching element may form another boost circuit, so AC electric power having different phases may be output to the second input/output port with power factors improved.

In an embodiment of the present disclosure, when a driving current is provided to the second driving motor or the electric power of the battery is converted and then provided to the charging inlet, the switching circuit may operate as an inverter.

In an embodiment of the present disclosure, the bidirectional power factor correction circuit may further include an additional input/output port having a terminal connected to the first switching element and the second switching element, a terminal connected to the third switching element and the fourth switching element, and a terminal connected to the fifth switching element and the sixth switching element, and the additional input/output port may be connected to the second driving motor.

In an embodiment of the present disclosure, the four wheel drive vehicle may further include a first switching element connected between the first input/output port and the charging inlet and a second switching element connected between the additional input/output port and the second driving motor.

In an embodiment of the present disclosure, wherein when the external charging electric power is applied through the charging inlet or the electric power of the battery is output through the charging inlet, the first switching element may be shorted and the second switching element may be opened, and when the four wheel drive vehicle is being driven, the first switching element may be opened and the second switching element may be shorted.

In an embodiment of the present disclosure, the bidirectional DC-DC converter may include: a first input/output port connected to the bidirectional power factor correction circuit; a transformer including two coils forming mutual inductance; a switching circuit connected between the first input/output port and a coil of the transformer; a second input/output port connected to the battery; and a second switching circuit connected between the second input/output port and the other coil of the transformer.

In an embodiment of the present disclosure, when the battery is charged, the first switching circuit may convert a DC voltage that is applied to the first input/output port into an AC voltage and then may apply the AC voltage to a coil of the transformer, and the second switching circuit may convert an AC voltage induced to the other coil of the transformer into a DC voltage and then may apply the DC voltage to the second input/output port.

In an embodiment of the present disclosure, when a driving current is provided to the second driving motor or the electric power of the battery is converted and then provided to the charging inlet, the second switching circuit may convert a DC voltage of the battery that is applied to the second input/output port into an AC voltage and then may apply the AC voltage to a coil of the transformer, and the first switching circuit may convert an AC voltage induced to the other coil of the transformer into a DC voltage and then may apply the DC voltage to the first input/output port.

In an embodiment of the present disclosure, the four wheel drive vehicle may further include a first switching element and a second switching element that electrically open or short both ends of each of the two coils in the transformer, in which when the battery is charged, the first switching element and the second switching element may be opened, and when a driving current is provided to the second driving motor or the electric power of the battery is converted and then provided to the charging inlet, the first switching element and the second switching element may be shorted.

In an embodiment of the present disclosure, the bidirectional DC-DC converter may include: a first input/output port connected to the bidirectional power factor correction circuit; a second input/output port connected to the battery; a first switching element having an end connected to a terminal of the first input/output port; an inductor having two ends respectively connected to the other end of the first switching element and a terminal of the second input/output port; and a second switching element having an end connected to a connection node of the first switching element and the inductor and the other end commonly connected to the other terminal of the first input/output port and the other terminal of the second input/output port.

In an embodiment of the present disclosure, when the battery is charged, duty of the first switching element may be controlled and a voltage of the first input/output port may be increased, so a charging voltage that can charge the battery may be output to the second input/output port.

In an embodiment of the present disclosure, when a driving current is provided to the second driving motor or the electric power of the battery is converted and then provided to the charging inlet, duty of the second switching element is controlled, so voltage of the battery is increased and output to the first input/output port, or the first switching element is shorted and the second switching element is opened, so the voltage of the battery is applied to the first input/output port without a change.

According to the four wheel drive vehicle, since the four wheel drive vehicle includes a bidirectional power converter that converts and provides the electric power stored in the battery to the driving motor when the vehicle is driven, and converts and provides the electric power provided from an external charging facility as charging power for the battery, so the number of parts can be reduced, thereby being able to simplify a four wheel drive system and improve competitiveness.

The effects of the present disclosure are not limited to the effects described above and other effects can be clearly understood by those skilled in the art from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
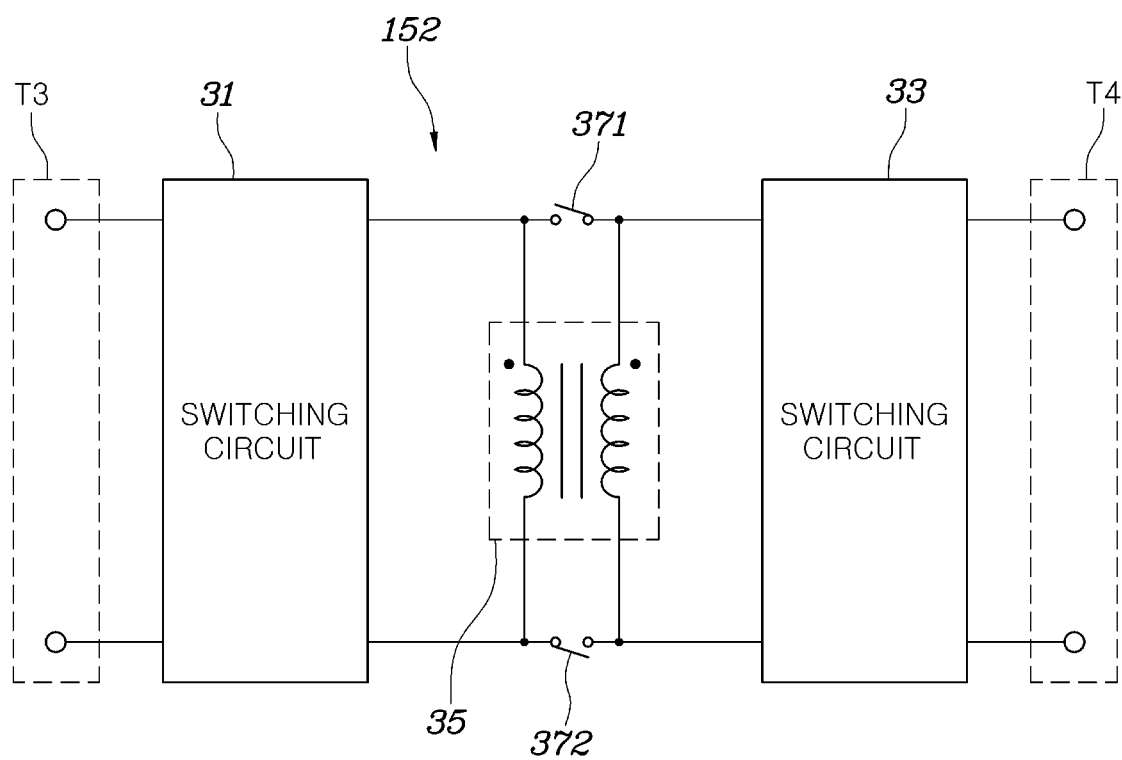
Figure 5:
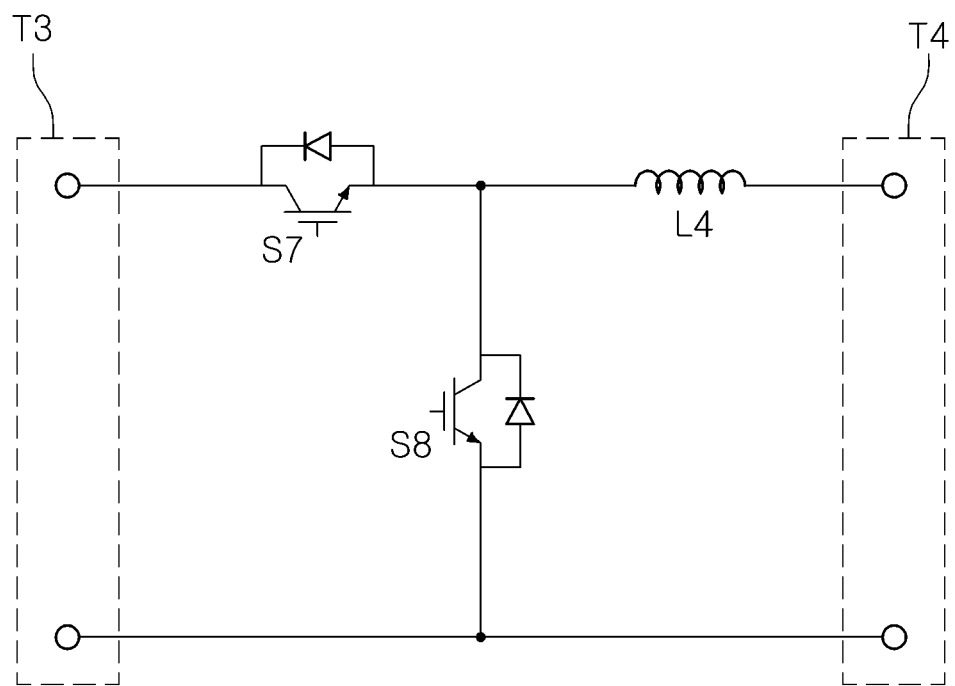

FIG. 4 is a circuit diagram showing in detail an example of a bidirectional DC-DC converter in the bidirectional power converter of the four wheel drive vehicle according to an embodiment of the present disclosure; and FIG. 5 is a circuit diagram showing in detail another example of a bidirectional DC-DC converter in the bidirectional power converter of the four wheel drive vehicle according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereafter, a four wheel drive vehicle according to various embodiments of the present disclosure is described hereafter in detail with reference to the accompanying drawings.

Figure 1:
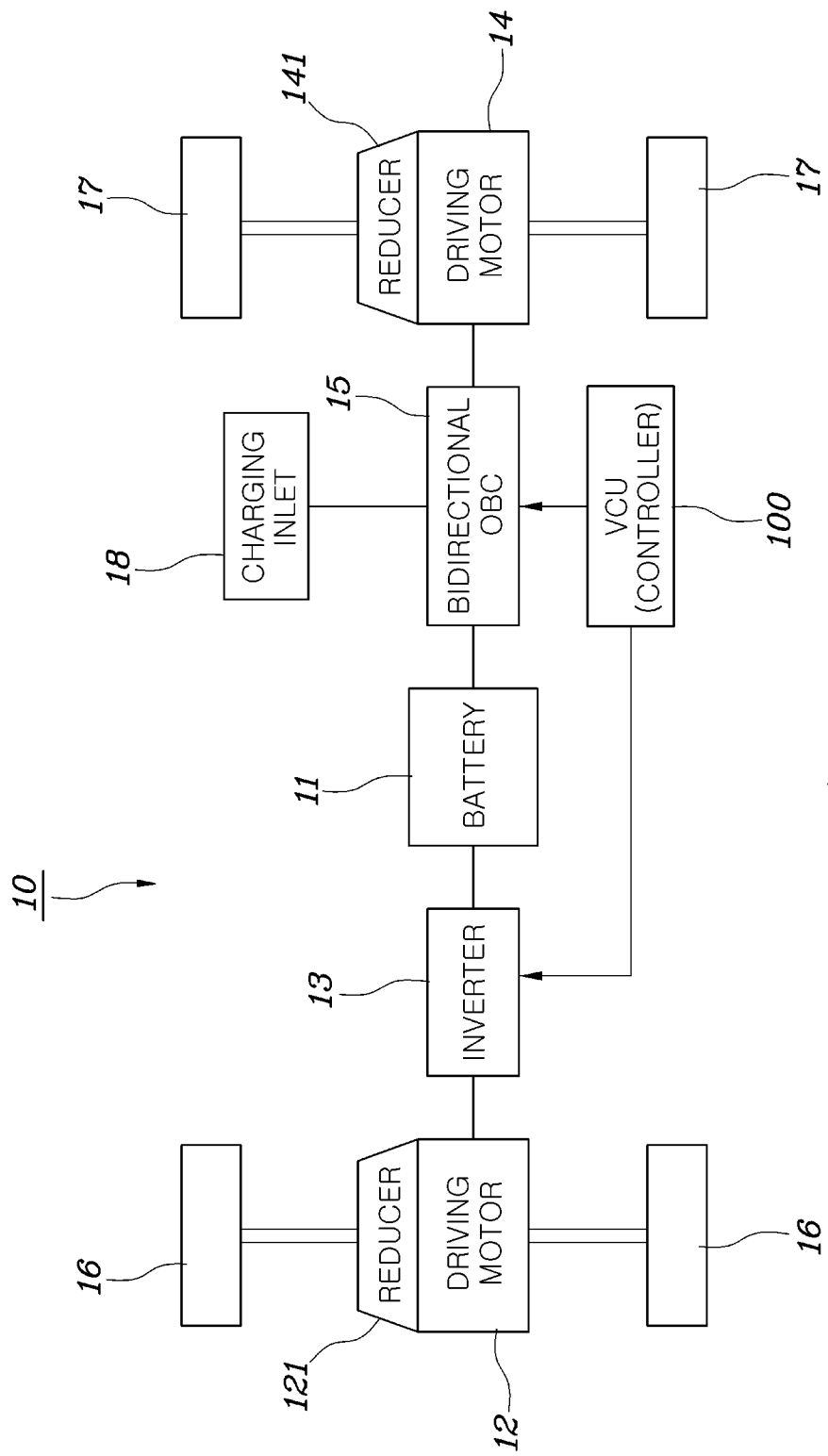
FIG. 1 is a block diagram showing the configuration of a four wheel drive vehicle according to an embodiment of the present disclosure.

FIG. 1 is a block diagram showing the configuration of a four wheel drive vehicle according to an embodiment of the present disclosure.

Referring to FIG. 1, the four wheel drive vehicle 10 may include: main driving wheels 16 and auxiliary driving wheels 17, a first driving motor 12 that provides power to the main driving wheels 16, a second driving motor 14 that provides power to the auxiliary driving wheels 17, a battery 11 that stores electrical energy, an inverter 13 that converts and provides the electrical energy stored in the battery 11 to the first driving motor 12, and a bidirectional power converter 15 that generates charging electric power for charging the battery 11 by converting power supplied from the outside of the vehicle and converts and provides the electrical energy stored in the battery 11 to the second driving motor 14.

The main driving wheels 16 may be wheels that are driven by relatively large power of the power for driving the vehicle and the auxiliary wheels 17 may be wheels that are driven by relatively small power of the power for driving the vehicle.

In the actual vehicles, the main driving wheels 16 and the auxiliary driving wheels 17 may be the front wheels or the rear wheels of the vehicles. For example, in a front wheel-based four wheel drive vehicle, the front wheel may be the main driving wheels 16 and the rear wheels may be the auxiliary driving wheels 17. As another example, in a rear wheel-based four wheel drive vehicle, the rear wheel may be the main driving wheels 16 and the front wheels may be the auxiliary driving wheels 17.

The driving wheels 16 and 17 can be rotated by the power from the driving motors 12 and 14, respectively. For the convenience of description, the driving motor 12 that supplies power to the main driving wheels 16 is referred to as a first driving motor and the driving motor 14 that supplies power to the auxiliary driving wheels 17 is referred to as a second driving motor.

The first and second driving motors 12 and 14, which are rotary electromechanical apparatuses for respectively supplying power, which can drive a vehicle, to driving wheels, may be various types of driving motors known in the art. For example, a driving motor may be a synchronous motor that includes: a stator including a plurality of coils that generates magnetic flux using separately supplied a plurality of phase (3-phase) AC electric power; and a rotor having a permanent magnet.

An AWD system prevents understeer and oversteer during driving, and the second driving motor 14 connected to the auxiliary driving wheels to be used for escaping out of a snowy road can secure sufficient performance suitable for desired uses even by using small power of ⅕ to ¼ in comparison to the first driving motor 12 connected to the main driving wheels. Accordingly, the second driving motor 14 may be a motor having rated power smaller than that of the first driving motor 12.

Power distribution between the main driving wheels 16 and the auxiliary driving wheels 17 may be achieved by controlling the power (torque) of the first driving motor 12 and the second driving motor 14, using a controller 100 (e.g., a Vehicle Control Unit (VCU) disposed in the vehicle. The power control of the first driving motor 12 and the second driving motor 14 may be achieved by electric power converters 13 and 15 that supply a driving current to the driving motors, respectively.

The power of the first driving motor 12 that outputs large power can be determined by controlling the inverter 13, which converts the energy stored in the battery 11 into 3-phase AC electric power and provides the 3-phase AC electric power to the driving motor 12, using the controller 100.

The inverter 13 is an electric power converter including a plurality of switching element and the switching elements can be pulse-width-modulated such that a driving current corresponding to target torque desired by the vehicle can be provided to the first driving motor 12. Various methods of controlling the inverter 13 such that driving motors used in vehicles can output requested torque have been known in the art, so the method of controlling the inverter 13 is not further described.

The second driving motor 14 that output relatively small power in comparison to the first driving motor 12 can be provided with 3-phase AC electric power converted from the electric power of the battery 11 by the bidirectional power converter 15.

The bidirectional power converter 15 can operate as an on board charger that converts the electric power of the battery 11 into 3-phase electric power and supplies the 3-phase electric power to the second driving motor 14 when the vehicle is driven, and that generates charging electric power that can charge the battery 11 by converting the electric power of an external charging facility that is provided through charging inlet 18 of the vehicle when the battery 11 is charged. Accordingly, the bidirectional power converter 15 may be referred to as a bidirectional OBC.

The bidirectional power converter 15 is an apparatus that can perform bidirectional powering in which powering is transmitted from the battery 11 to the second driving motor 14 when the second driving motor 14 is driven, and power is transmitted to the battery 11 during charging.

Figure 2:
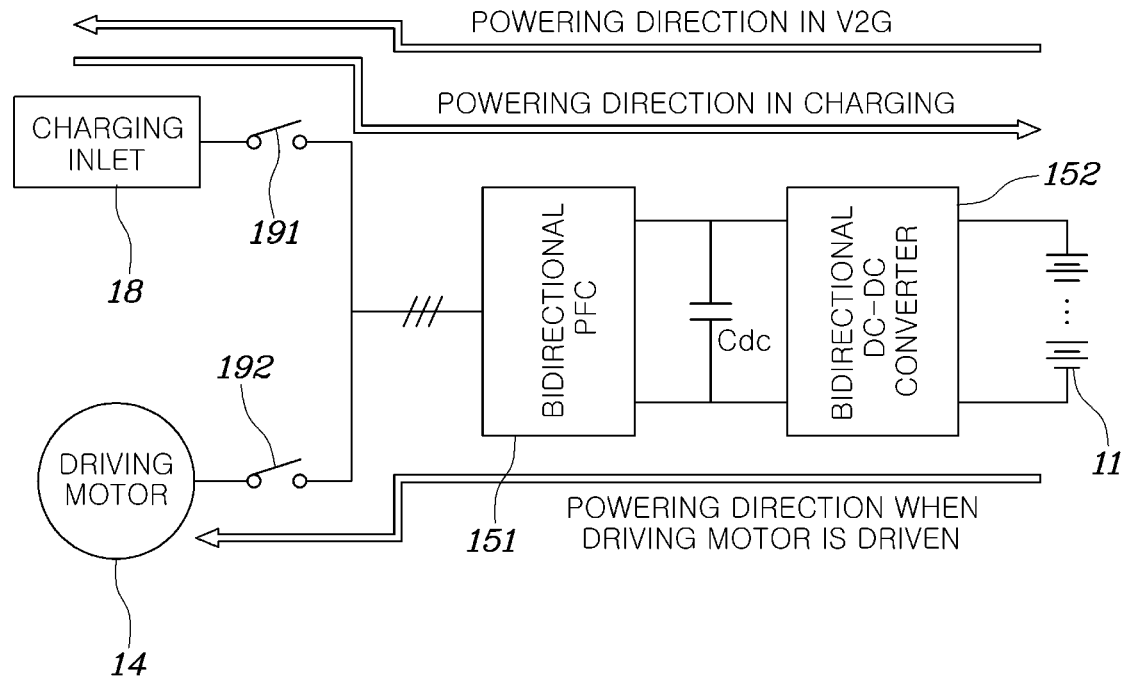
FIG. 2 is a block diagram showing in detail the configuration of a bidirectional power converter of the four wheel drive vehicle according to an embodiment of the present disclosure.

FIG. 2 is a block diagram showing in detail the configuration of a bidirectional power converter of the four wheel drive vehicle according to an embodiment of the present disclosure.

Referring to FIG. 2, the bidirectional power converter 15 of the four wheel drive vehicle may include a bidirectional power factor correction circuit 151 and a bidirectional DC-DC converter 152.

The power factor correction circuit 151 may be implemented by topology of common boost circuit for increasing the power factor of an AC current and providing the AC current to the battery 11 when the battery 11 is charged with system electric power of an external charging facility that is supplied from the charging inlet 18.

Further, when a driving current is supplied to the second driving motor 14, the bidirectional PFC circuit 151 can convert DC electric power provided from the battery 11 into 3-phase AC electric power. Further, the bidirectional PFC circuit 151 can convert DC electric power provided from the battery 11 into 3-phase AC electric power also in a process of implementing Vehicle to Grid (V2G) that supplies the electric power stored in the battery 11 of the vehicle to an external system.

When the battery 11 is charged with system power of an external charging facility that is supplied from the charging inlet 18, the bidirectional DC-DC converter 152 can change the magnitude of an output voltage of the bidirectional PFC circuit 151 into magnitude of a voltage that can charge the battery 11, and can apply the voltage to the battery 11.

Further, when a driving current is supplied to the second motor 14, the bidirectional DC-DC converter 152 can provide the DC voltage output from the battery 11 to the bidirectional PFC circuit 151 after changing the magnitude of the DC voltage or bypassing the DC voltage. Further, the bidirectional DC-DC converter 152 can provide supply the DC voltage output from the battery 11 to the bidirectional PFC circuit 151 after changing the magnitude of the DC voltage or bypassing the DC voltage also in a process of implementing Vehicle to Grid (V2G) that supplies the electric power stored in the battery 11 of the vehicle to an external system.

The four wheel drive vehicle according to an embodiment of the present disclosure may include switching units 191 and 192 for determining the powering path in according to the use of the bidirectional power converter 15. For example, when the battery 11 is charged or V2G is implemented, the switching element 191 connected between the charging inlet 18 and the bidirectional PFC circuit 151 of the vehicle can be shorted and the switching element 192 connected between the second driving motor 14 and the bidirectional PFC circuit 151 can be opened. Further, when the second driving motor 14 is driven, the switching element 191 connected between the charging inlet 18 and the bidirectional PFC circuit 151 of the vehicle can be opened and the switching element 192 connected between the second driving motor 14 and the bidirectional PFC circuit 151 can be shorted.

Figure 3:
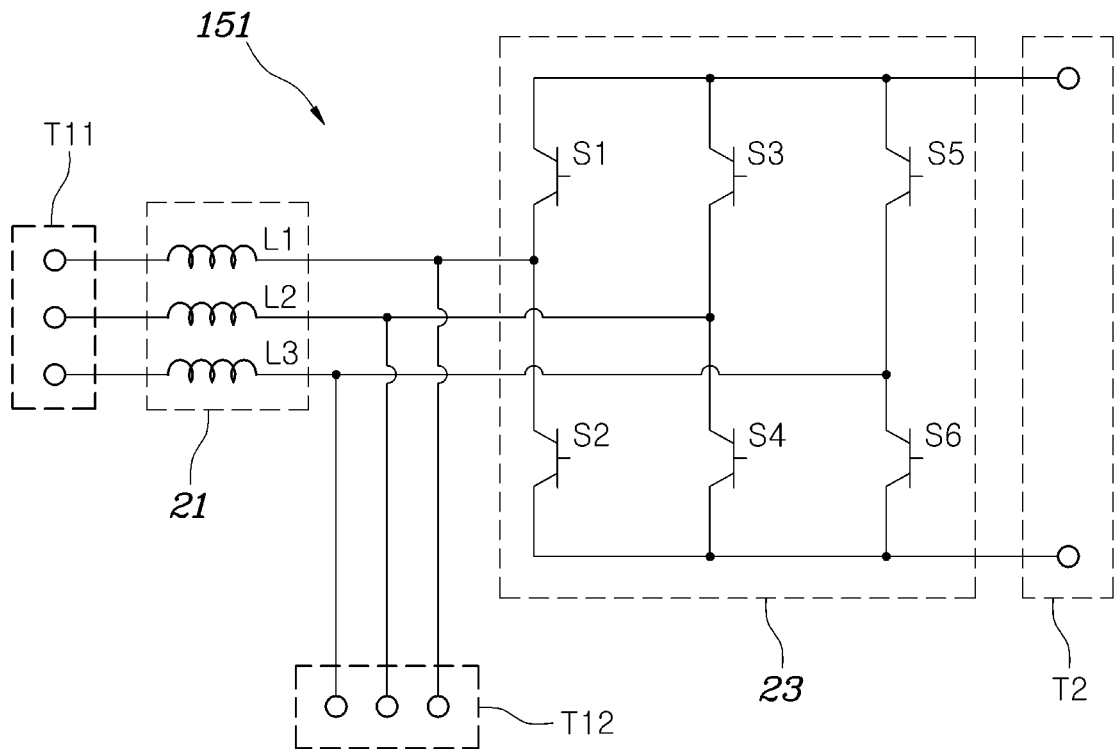
FIG. 3 is a circuit diagram showing in detail a bidirectional power factor correction circuit in the bidirectional power converter of the four wheel drive vehicle according to an embodiment of the present disclosure.

FIG. 3 is a circuit diagram showing in detail a bidirectional power factor correction circuit in the bidirectional power converter of the four wheel drive vehicle according to an embodiment of the present disclosure.

Referring to FIG. 3, the bidirectional power factor correction circuit in the bidirectional power converter of the four wheel drive vehicle may include: a first input/output port T11 connected to the charging inlet 18 or the second driving motor 14; a second input/output port T2 connected to the bidirectional DC-DC converter 152; a boost inductor circuits 21 including a plurality of boost inductors L1, L2, L3 and disposed between the first input/output port T11 and the second input/output port T2; and a switching circuit 23 including switching elements S1-S6.

The first input/output port T11 may have three terminals and first ends of the boost inductors L1, L2, and L3 can be connected to the terminals, respectively. The switching circuit 23 may include a first switching element S1 and a second switching element S2 connected in series to each other between two terminals of the second input/output port T2 having the two terminals, a third switching element S3 and a fourth switching element S4 connected in series to each other between the two terminals of the second input/output port T2, and a fifth switching element S5 and a sixth switching element S6 connected in series to each other between the two terminals of the second input/output port T2. Second ends of the boost inductors L1, L2, and L3 can be connected respectively to a connection node of the first switching element S1 and the second switching element L2, a connection node of the third switching element S3 and the fourth switching element S4, and a connection node of the fifth switching element S5 and the sixth switching element S6.

When 3-phase AC currents having different phases are input respectively to the terminals of the first input port T11 from the charging inlet 18 and the battery 11 is charged, the electric power that is input to the first input/output port T11 is output to the second input/output port T2 with the power factor thereof corrected by the boost circuit formed by the boosting inductor circuit 21 and the switching circuit 23.

That is, the first boost inductor L1, the first switching element S1, and the second switching element S2 form one boost circuit, the second boost inductor L2, the third switching element S3, and the fourth switching element S4 form another boost circuit, and the third boost inductor L3, the fifth switching element S5, and the sixth switching element S6 form another boost circuit, whereby it is possible to output AC electric power having different phases to the second input/output port T2 with the power factors improved.

It is possible to generate a DC voltage at the input/output port of the bidirectional DC-DC converter 152 by connecting a DC link capacitor (Cdc in FIG. 2) between the two terminals of the second input/output port T2.

Meanwhile, when a driving current is provided to the second driving motor 14 or the electric power of the battery 11 is converted and then provided to the charging inlet 18 to implement V2G, the switching circuit 23 can operate to convert the DC electric power that is applied to the second input/output port T2 into 3-phase AC electric power that is output to each of the terminals of the first input/output port T11. That is, when the switching element 23 operates the same as an inverter, 3-phase AC electric power converted from the DC electric power of the battery 11 can be provided to the first input/output port T11. This operation of the switching circuit 23 can be controlled by a controller 100.

The switching unit 191 may be disposed between the first input/output port T11 and the charging inlet 18 and the switching unit 192 may be disposed between the first input/output port T11 and the second driving motor 14. The short or open state of the switching units 191 and 192 can also be determined by control of the controller 10 such that a powering path can be appropriately formed.

Meanwhile, an additional input/output port T12 directly connected to the connection nodes of the switching elements connected in series in the switching circuit 23 may be selectively provided. In the embodiment in which the additional input/output port T12 is added, the additional input/output port T12 can be directly connected to the second driving motor 14. When the additional input/output port T12 is provided, the switching unit 191 may be disposed between the first input/output port T11 and the charging inlet 18 and the switching unit 192 may be disposed between the additional input/output port T12 and the second driving motor 14.

Though not shown in the figures, an EMI filter for removing distortion of system electric power, etc. may be disposed between the first input/output port T11 and the boost inductor circuit 21. That is, when the battery 11 is charged, a large-capacity EMI filter is desired to remove various noises, etc., but when electric power is supplied to the second driving motor 14, the EMI filter is not needed because the driving motor 14 itself has large inductance. Accordingly, when electric power is supplied to the second driving motor 14, it may be possible and more efficient to bypass the boost inductor circuit 21 or the EMI filter and providing the 3-phase electric power generated by the switching circuit 23 directly to the second driving motor 14.

FIG. 4 is a circuit diagram showing in detail an example of a bidirectional DC-DC converter in the bidirectional power converter of the four wheel drive vehicle according to an embodiment of the present disclosure.

The example shown in FIG. 4 is an insulating DC-DC converter that uses a transformer 35. The insulating DC-DC converter may include: a transformer 35 including two coils forming mutual inductance in cooperation with an input/output port T3 connected to the second input/output port T2 of the bidirectional PFC circuit 151; a switching circuit 31 connected between the input/output port T3 and a coil of the transformer 35; and a switching circuit 33 connected between an input/output port T4 connected to the battery 11 and the other coil of the transformer 35.

When the battery 11 is charged, the switching circuit 31 converts a DC voltage that is applied to the input/output port T3, that is, a DC voltage generated at the second input/output port T2 of the bidirectional PFC circuit 151 into an AC type and then applies it to a coil of the transformer 35. An AC voltage induced to the other coil of the transformer 35 by mutual inductance is converted back into a DC type by the switching circuit 33 and then output to the input/output port T4, whereby charging electric power can be provided to the battery 11. Obviously, the magnitude of the AC voltage induced to the other coil can be determined by a turn ratio between the two coils of the transformer 35.

Meanwhile, when a driving current is provided to the second driving motor 14 or the electric power of the battery 11 is converted and provided to the charging inlet 18 to implement V2G, the switching circuit 33 converts the DC voltage of the battery 11 that is applied to the input/output port T4 into an AC type and then applies it to a coil of the transformer 35. An AC voltage induced to the other coil of the transformer 35 by mutual inductance is converted back into a DC type by the switching circuit 31 and then output to the input/output port T3, whereby the electric power of the battery 11 can be converted and provided to the second input/output port T2 of the bidirectional PFC circuit 151.

Selectively, the bidirectional DC-DC converter 152 may further include switching units 371 and 372 that can electrically connect/disconnect both ends of the two coils in the transformer 35. When the battery 11 is charged, that is, when powering is performed from the input/output port T3 to the input/output port T4, it is desired to generate a voltage having appropriate magnitude at the input/output port T4 to be able to charge the battery 11, so it is desired to change the magnitude of a voltage by opening the switching units 371 and 372. However, when electric power is provided to the second driving motor 14 or the system from the battery 11, that is, when powering is performed from the input/output port T4 to the input/output port T3, the switching units 371 and 372 are shorted or the transformer 35 is bypassed, whereby the voltage of the battery 11 can be applied, as it is, to the second input/output port T2 of the bidirectional PFC circuit 151.

FIG. 5 is a circuit diagram showing in detail another example of a bidirectional DC-DC converter in the bidirectional power converter of the four wheel drive vehicle according to an embodiment of the present disclosure.

The example shown in FIG. 5 is a non-insulating DC-DC converter. The non-insulating DC-DC converter may include a switching element S7 having an end connected to a terminal of the input/output port T3, an inductor L4 having two ends respectively connected to the other end of the switching element S7 and a terminal of the input/output port T4, and a switching element S8 having an end connected to a connection node of the switching element S7 and the inductor L4 and the other end commonly connected to the other terminal of the input/output port T3 and the other terminal of the input/output port T4.

The non-insulating DC-DC converter shown in FIG. 5 can operate as a buck converter that decreases a voltage when powering is performed from the input/output port T3 to the input/output port T4, and can operate as a boost converter that increases a voltage when powering is performed from the input/output port T4 to the input/output port T3.

When the battery 11 is charged, it is possible to generate a voltage, which can charge the battery 11, at the input/output port T4 by decreasing the voltage of the input/output port T3 by controlling duty of the switching element S7.

Further, when a driving current is provided to the second driving motor 14 or the electric power of the battery 11 is converted and provided to the charging inlet 18 to implement V2G, it is possible to increase and apply the voltage of the battery 11 to the input/output port T3 by controlling the duty of the switching element S8. As another example, it is possible to apply the voltage of the battery 11 to the input/output port T3 without a change by shorting the switching element S7 and opening the switching element S8.

As described above, according to the four wheel drive vehicle of several embodiments of the present disclosure, an OBC for charging a battery and an inverter supplying driving electric power to a driving motor providing power to auxiliary wheels are integrated, thereby being able to simplify the configuration of the vehicle. Accordingly, it is possible to reduce the volume of a four wheel drive system and reduce the costs, thereby being able to secure high competitiveness.

Although the present disclosure was described above with reference to specific embodiments, it would be apparent to those skilled in the art that the present disclosure may be changed and modified in various ways.

What is claimed is:

1. A four wheel drive vehicle comprising:
   main driving wheels and auxiliary driving wheels;
   a first driving motor configured to provide power to the main driving wheels;
   a second driving motor configured to provide power to the auxiliary driving wheels;
   a battery configured to store electrical energy;
   an inverter configured to convert and provide the electrical energy stored in the battery to the first driving motor; and
   a bidirectional power converter configured to generate charging electric power for charging the battery by converting power supplied from an outside of the vehicle and configured to convert and provide the electrical energy stored in the battery to the second driving motor,
   wherein the bidirectional power converter includes:
   a bidirectional power factor correction circuit selectively connected to the second driving motor or a charging inlet configured to supply external charging electric power, and a bidirectional DC-DC converter connected between the bidirectional power factor correction circuit and the battery, wherein the bidirectional power factor correction circuit includes:
- a first input/output port selectively connected to the charging inlet or the second driving motor, wherein the bidirectional DC-DC converter includes:
- a first input/output port connected to the bidirectional power factor correction circuit;
- a transformer including first and second coils forming mutual inductance;
- a first switching circuit connected between the first input/output port and the first coil of the transformer;
- a second input/output port connected to the battery; and
- a second switching circuit connected between the second input/output port and the second coil of the transformer, and
- a first switching element and a second switching element that electrically open or short both ends of each of the first and second coils in the transformer, and wherein when the battery is charged, the first switching element and the second switching element are opened, and when a driving current is provided to the second driving motor or the electric power of the battery is converted and then provided to the charging inlet, the first switching element and the second switching element are shorted.

2. The four wheel drive vehicle of claim 1, wherein the second driving motor has rated power smaller than rated power of the first driving motor.

3. The four wheel drive vehicle of claim 1, further comprising:
- a first switching element connected between the bidirectional power converter and the charging inlet configured to supply external charging electric power, and
- a second switching element disposed between the bidirectional power converter and the second driving motor.

4. The four wheel drive vehicle of claim 3, wherein when the external charging electric power is applied through the charging inlet or the electric power of the battery is output through the charging inlet, the first switching element is shorted and the second switching element is opened, and when the four wheel drive vehicle is being driven, the first switching element is opened and the second switching element is shorted.

5. The four wheel drive vehicle of claim 1, wherein the bidirectional power factor correction circuit further includes:
- a second input/output port connected to the bidirectional DC-DC converter;
- a boost inductor circuit including a plurality of boost inductors connected respectively to terminals of the first input/output port; and
- a switching circuit including a plurality of switching elements connected to the boost inductor circuit.

6. The four wheel drive vehicle of claim 5, wherein the first input/output port has three terminals and the plurality of boost inductors includes a first boost inductor, a second boost inductor, and a third boost inductor respectively connected to the three terminals of the first input/output port;

wherein the second input/output port has two terminals and the switching circuit includes a first switching element and a second switching element connected to each other in series between the two terminals of the second input/output port, a third switching element and a fourth switching element connected to each other in series between the two terminals of the second input/output port, and a fifth switching element and a sixth switching element connected to each other in series between the two terminals of the second input/output port; and wherein a second end of the first boost inductor is connected to a connection node of the first switching element and the second switching element, a second end of the second boost inductor is connected to a connection node of the third switching element and the fourth switching element, and a second end of the third boost inductor is connected to a connection node of the fifth switching element and the sixth switching element.

7. The four wheel drive vehicle of claim 6, wherein when 3-phase AC currents having different phases are input respectively to the terminals of the first input port from the charging inlet and the battery is charged, the first boost inductor, the first switching element, and the second switching element are configured to form a first boost circuit, the second boost inductor, the third switching element, and the fourth switching element are configured to form a second boost circuit, and the third boost inductor, the fifth switching element, and the sixth switching element are configured to form a third boost circuit, such that AC electric power having different phases is output to the second input/output port with power factors improved.

8. The four wheel drive vehicle of claim 6, wherein when a driving current is provided to the second driving motor or the electric power of the battery is converted and then provided to the charging inlet, the switching circuit operates as an inverter.

9. The four wheel drive vehicle of claim 6, wherein the bidirectional power factor correction circuit further includes an additional input/output port having a terminal connected to the first switching element and the second switching element, a terminal connected to the third switching element and the fourth switching element, and a terminal connected to the fifth switching element and the sixth switching element, and the additional input/output port is connected to the second driving motor.

10. The four wheel drive vehicle of claim 9, further comprising: a first switching element connected between the first input/output port and the charging inlet and a second switching element connected between the additional input/output port and the second driving motor.

11. The four wheel drive vehicle of claim 10, wherein when the external charging electric power is applied through the charging inlet or the electric power of the battery is output through the charging inlet, a first switching element is shorted and a second switching element is opened, and when the four wheel drive vehicle is being driven, the first switching element is opened and the second switching element is shorted.

12. The four wheel drive vehicle of claim 1, wherein when the battery is charged, the first switching circuit converts a DC voltage that is applied to the first input/output port into an AC voltage and then applies the AC voltage to the first coil of the transformer, and the second switching circuit converts an AC voltage induced to the second coil of the transformer into a DC voltage and then applies the DC voltage to the second input/output port.

13. The four wheel drive vehicle of claim 1, when a driving current is provided to the second driving motor or the electric power of the battery is converted and then provided to the charging inlet, the second switching circuit converts a DC voltage of the battery that is applied to the second input/output port into an AC voltage and then applies the AC voltage to the second coil of the transformer, and the first switching circuit converts an AC voltage induced to the first coil of the transformer into a DC voltage and then applies the DC voltage to the first input/output port.

* * * * *